United States Patent [19]

Brandt et al.

[11] Patent Number: 5,665,469

[45] Date of Patent: Sep. 9, 1997

[54] MULTILAYER ORIENTED HEAT-SEALABLE POLYPROPYLENE FILM

[75] Inventors: Rainer Brandt, Walsrode; Ulrich Reiners, Neuenkirchen, both of Germany

[73] Assignee: Wolff Walsrode Aktiengesellschaft, Walsrode, Germany

[21] Appl. No.: 565,039

[22] Filed: Nov. 30, 1995

[30] Foreign Application Priority Data

Dec. 7, 1994 [DE] Germany ............... 44 43 458.8

[51] Int. Cl.⁶ .................... B32B 27/32; B32B 31/12
[52] U.S. Cl. .................... 428/349; 428/461; 428/515; 428/516; 428/355 EN
[58] Field of Search .................... 428/344, 343, 428/347, 349, 355, 515, 516, 35.8, 461

[56] References Cited

U.S. PATENT DOCUMENTS

| | | | |
|---|---|---|---|
| 4,888,237 | 12/1989 | Balloni et al. | 428/345 |
| 5,425,996 | 6/1995 | Wilkie et al. | 428/461 |

*Primary Examiner*—Paul J. Thibodeau
*Assistant Examiner*—Donald Lawrence Tarazano
*Attorney, Agent, or Firm*—Sprung Horn Kramer & Woods

[57] ABSTRACT

The present invention relates to an oriented, particularly a biaxially oriented, sealable, metallisable multilayer film, characterised in that it is built up as follows:
ABCBD
a) where C is the core layer comprising isotactic polypropylene with an MFI between 0.5 and 4.5 g/10 min,
b) A is the base layer for vacuum evaporation, comprising 0.1–0.5% of an organic or inorganic spacer and 1 to 10% of an ethylene/octene copolymer with a density <0.915 g/cm³, and 89.5 to 98.9% of a heat-sealable propylene/ethylene copolymer with an ethylene content of 1 to 8%,
c) B represents the two intermediate layers comprising a propylene homopolymer with an MFI between 2 and 12 g/10 min,
d) and D is the sealable layer comprising an olefinic homo-, co- or terpolymer and 0.1 to 0.5% of an inorganic or organic spacer, or a mixture of the two classes of spacer. The film is desirably metallized with a metal or metal oxide layer.

4 Claims, No Drawings

MULTILAYER ORIENTED HEAT-SEALABLE POLYPROPYLENE FILM

This invention relates to a vacuum-coatable, multilayer, oriented, heat-sealable polypropylene film having a good barrier effect against water vapour, oxygen and aromas. The film to which the invention relates has as its characterising features a core layer of isotactic polypropylene, two intermediate layers of isotactic polypropylene, an outer layer pretreated with a corona discharge and comprising a blend of a propylene/ethylene copolymer and an ethylene/octene copolymer, and a sealable layer of an olefinic co- or terpolymer.

Due to their good barrier properties against water vapor, oxygen, light and aromas, polypropylene films which are vacuum-coated with metals or metal oxides are mostly used for the packaging of sensitive foodstuffs. In addition to these functional properties, however, the appearance of the film also plays a very important part. Moreover, the film has to be capable of being processed without problems on high speed packaging machines.

Thus EP-A 329 336 describes a metallisable film which has good barrier properties. Due to the high homopolymer content in the layer to be metallised, however, the adhesion of the evaporated layer is insufficient for current requirements.

EP-A 395 204 describes a metallisable film which exhibits improved adhesion of the metal. However, due to the coextrusion process employed in this application, the metallised film has disadvantages as regards its appearance.

EP-A 562 496 describes a film having an ethylene/octene copolymer in its outer layer or layers. This film is unsuitable for vacuum coating, however, due to its shrinkage behaviour.

It has therefore been shown to be necessary to produce a metallisable BOPP film which has improved barrier properties against water vapour and oxygen and a low coefficient of friction, and which is of brilliant appearance.

This object is achieved by means of a film according to claim 1. The preferred feature is that the five-layer film contains a vacuum-coatable film comprising a blend of a propylene/ethylene copolymer and an ethylene/octene copolymer (d<0.915 g/cm$^3$), the two intermediate layers contain a propylene homopolymer with a melt flow index (MFI) between 2 and 12 g/10 min, preferably between 5 and 11 g/10 min, the core layer contains an isotactic polypropylene with an MFI between 0.5 and 4.5 g/10 min, and the sealable outer layer contains an olefinic homo-, co- or terpolymer.

In order to ensure that machinery runs smoothly when processing biaxially oriented polypropylene films, it is necessary to provide at least the sealable or outer layers with additives. When provided with lubricants such as erucic acid amide or polydimethylsiloxane, however, vacuum-coated films exhibit poor adhesion of the vacuum-deposited layer to the base film. In order to make the film run smoothly in machinery despite a lack of lubricants, it is necessary to equip the outer layer with a sufficient number of spacer particles. Common spacers include particles with an average diameter between 1 and 5 μm, comprising silica, magnesium silicates, sodium aluminum silicates or potassium aluminium silicates (inorganic spacers), or crosslinked polymethyl methacrylate, polyethylene or polyamide (organic spacers).

Amongst the numerous materials used for sealable and vacuum-coatable layers, the following are preferably used:
random propylene/ethylene copolymers
random propylene/olefine (1) copolymers
random propylene/ethylene/olefine terpolymers
mixtures of two or three of the above polymers.

A blend which is particularly preferred comprises a propylene/ethylene copolymer (90–99%), characterised in that it contains 1.0–10% polyethylene and melts between 110° C. and 150° C., preferably between 120° C. and 140° C., and an ethylene/octene copolymer (1–10%), which is characterised in that it has a density <0.915 g/cm$^3$.

The films according to the invention can be produced by the usual processes such as lamination, coating or melt coextrusion. After extrusion and solidification of the thick film on the casting roll, the film is oriented in its direction of travel (longitudinally), using a stretching ratio of 4/1 to 7/1 at a temperature of 120° C.–150° C. The stretching ratio in the transverse direction is preferably between 8/1 and 12/1, and transverse stretching of the film is effected at a temperature between 130° C. and 170° C. The subsequent thermofixing step is preferably carried out at 1° C.–40° C. below the transverse stretching temperature. In order to ensure affinity of the substantially nonpolar film surface with printing inks, it is necessary to subject the film to a corona discharge pretreatment. In the course of this step, atmospheric oxygen is deposited on the film surface in the form of carbonyl, epoxide, ether or alcohol groups. Other methods of pretreating polypropylene films include time or plasma pretreatment, and pretreatment with excimer lamps in the UV range.

EXAMPLE 1

A biaxially oriented film (area stretching ratio: 45/1; longitudinal stretching temperature: 142° C.; transverse stretching temperature: 160° C.) was produced by means of the production process described above, and had the following structure:
Total thickness: 20 μm Layer sequence: ABCBD

Outer Layer for Coating in Vacuum (A)

Thickness: 1 μm

Material: 94.75% propylene/ethylene copolymer with an ethylene content of 3.5%, MFI: 5.0 g/10 min. 5.0% ethylene/octene copolymer; density: 0.912 g/cm$^3$ 0.25% SiO$_2$, average particle size: 2.5 μm

Intermediate Layers (B)

Thickness: 1 μm

Material: 100% isotactic polypropylene; MFI: 3.3 g/10 min.

Core Layer (C)

Thickness: 16 μm

Material: 100% isotactic polypropylene; MFI: 9.0 g/10 min.

Sealing Layer (D)

Thickness: 1 μm Material: 99.75% propylene/ethylene copolymer with an ethylene content of 3.5%, MFI: 5.0 g/10 min. 0.25% SiO$_2$, average particle size: 2.5 μm

COMPARISON EXAMPLE 1

A biaxially oriented film (area stretching ratio: 45/1; longitudinal stretching temperature: 142° C.; transverse stretching temperature: 160° C.) was produced by means of the production process described above, and had the following structure:

Total thickness: 20 μm Layer sequence: ACD

Outer Layer for Coating in Vacuum (A)

Thickness: 1 μm

Material: 94.75% propylene/ethylene copolymer with an ethylene content of 3.5%, MFI: 5.0 g/10 min. 5.0% ethylene/octene copolymer; density: 0.912 g/cm$^3$ 0.25% SiO$_2$, average particle size: 2.5 μm

Core Layer (C)

Thickness: 18 μm

Material: 100% isotactic polypropylene; MFI: 9.0 g/10 min.

Sealing Layer (D)

Thickness: 1 μm

Material: 99.75% propylene/ethylene copolymer with an ethylene content of 3.5%, MFI: 5.0 g/10 min. 0.25% SiO$_2$, average particle size: 2.5

COMPARISON EXAMPLE 2

A biaxially oriented film (area stretching ratio: 45/1; longitudinal stretching temperature: 142° C.; transverse stretching temperature: 160° C.) was produced by means of the production process described above, and had the following structure:

Total thickness: 20 μm Layer sequence: ABCBD

Outer Layer for Coating in Vacuum (A)

Thickness: 1 μm

Material: 99.75% propylene/ethylene copolymer with an ethylene content of 3.5%, MFI: 5.0 g/10 min. 0.25% SiO$_2$, average particle size: 2.5 μm

Intermediate Layers (B)

Thickness: 1 μm

Material: 100% isotactic polypropylene; MFI: 3.3 g/10 min.

Core Layer (C)

Thickness: 16 μm

Material: 100% isotactic polypropylene; MFI: 9.0 g/10 min.

Sealing Layer (D)

Thickness: 1 μm

Material: 99.75% propylene/ethylene copolymer with an ethylene content of 3.5%, MFI: 5.0 g/10 min. 0.25% SiO$_2$, average particle size: 2.5 μm

COMPARISON EXAMPLE 3

A biaxially oriented film (area stretching ratio: 45/1; longitudinal stretching temperature: 142° C.; transversal stretching temperature: 160° C.) was produced by means of the production process described above, and had the following structure:

Total thickness: 20 μm Layer sequence: ACD

Outer Layer for Coating in Vacuum (A)

Thickness: 1 μm

Material: 99.75% propylene/ethylene copolymer with an ethylene content of 3.5%, MFI: 5.0 g/10 min. 0.25% SiO$_2$, average particle size: 2.5 μm

Core Layer (C)

Thickness: 18 μm

Material: 100% isotactic polypropylene; MFI: 9.0 g/10 min.

Sealing Layer (D)

Thickness: 1 μm

Material: 99.75% propylene/ethylene copolymer with an ethylene content of 3.5%, MFI: 5.0 g/10 min. 0.25% SiO$_2$, average particle size: 2.5 μm The films described in the Example and in the Comparison Examples were coated in vacuum with aluminium to an optical density of 2.0.

The following Table shows that the film according to the invention is considerably superior to the films without ethylene/octene copolymer and to the three-layer films.

|  | Permeability to water vapour (g/m$^2$d) | Permeability to O$_2$ (cm$^3$/m$^2$d bar) | Assessment of appearance |
| --- | --- | --- | --- |
| Example 1 | 0.15 | 46 | ++ |
| Comparison 1 | 0.21 | 62 | – |
| Comparison 2 | 0.45 | 378 | ++ |
| Comparison 3 | 0.39 | 384 | – |

METHODS OF MEASUREMENT

Determination of the Permeability to Water Vapor

The permeability to water vapour was determined according to DIN 53122, Part 2, at 23° C. and 85% relative atmospheric humidity difference.

Determination of the Permeability to Oxygen

The permeability to oxygen was determined according to DIN 53380, Part 3, at 23° C. and 0% relative atmospheric humidity.

Appearance of the Metallised Specimens

The metallised specimens were attached, completely flat, to a glass plate and were then assessed in terms of their ability to reflect objects without distortion:

++ : the object is reflected true to the original

+ : the reflected image exhibits a slight lack of definition

_ : the reflected image exhibits a pronounced lack of definition

– : the object can no longer be recognised.

We claim:

1. An oriented, particularly a biaxially oriented, sealable, metallizable multilayer film, characterized in that it is built up as follows:

ABCBD a) where C represents a core layer comprising isotactic polyprolylene with a melt flow index between 0.5 and 4.5 g/10 min, b) A represents a base layer for vacuum evaporation, comprising 0.1–0.5% of organic or inorganic spacing particles and 1 to 10% of an ethylene/octene copolymer with a density <0.915 g/cm³, and 89.5 to 98.9% of a heat-sealable propylene/ethylene copolymer with an ethylene content of 1 to 8%, c) B represents the two intermediate layers comprising a propylene homopolymer with a melt flow index between 2 and 12 g/10 min, d) and D represents a sealable layer comprising an olefinic homo-, co- or terpolymer and 0.1 to 0.5% of inorganic or organic spacing particles, or mixtures thereof.

2. A film according to claim 1, wherein layer A it is flame- or plasma-treated, or corona discharge treated, or is treated by means of excimer lamps.

3. A film according to claim 1, wherein layer A is vacuum coated with an element, or with oxides of the element, of the first to fourth main group or subgroup of the periodic table of the elements.

4. A film according to claim 1, characterized in that said spacing particles are selected from the group consisting of silica, magnesium silicates, sodium aluminum silicates, potassium silicates, crosslinked polyethyl methacylate, polyethylene, polyamide and mixtures thereof.

* * * * *